United States Patent [19]

Gerber et al.

[11] Patent Number: 4,500,030
[45] Date of Patent: Feb. 19, 1985

[54] FLANGE WELD TECHNIQUE

[75] Inventors: James E. Gerber, Walbridge; Robert J. Kovacs, Oregon; Willy Herrmann, Toledo, all of Ohio

[73] Assignee: APX Group, Inc., Toledo, Ohio

[21] Appl. No.: 417,210

[22] Filed: Sep. 13, 1982

[51] Int. Cl.³ .............................................. B23K 9/225
[52] U.S. Cl. .................................. 228/125; 29/157.4; 228/168; 228/162; 228/183
[58] Field of Search .............. 228/125, 168, 169, 182, 228/183, 215, 160, 162; 29/157.4, 157.3 C

[56] References Cited

U.S. PATENT DOCUMENTS 2,258,913 10/1941 Stone .................................... 228/125
2,914,346 11/1959 Ryder .................................... 228/125
3,608,173 9/1971 Watson et al. ....................... 228/125

FOREIGN PATENT DOCUMENTS 5139193 10/1980 Japan .................................... 228/183
54-50479 11/1980 Japan ............................. 29/157.3 C Primary Examiner—Kenneth J. Ramsey
Attorney, Agent, or Firm—Anthony J. Casella; Gerald E. Hespos

[57] ABSTRACT

A technique for securing a tube to a flange includes the steps of inserting the end of the tube into an aperture provided on the flange from the first side of the flange such that a portion of the tube extends at least to, and preferably beyond the second side of the flange opposite the first side. A ceramic plug is optionally inserted into the end of the tube to prevent weld spatter and tube burn-through. The tube is then welded to the flange about the circumference of the tube from the second side of the flange, and that portion of the tube which extends beyond the second side of the flange is removed by grinding to produce the finished product.

12 Claims, 8 Drawing Figures

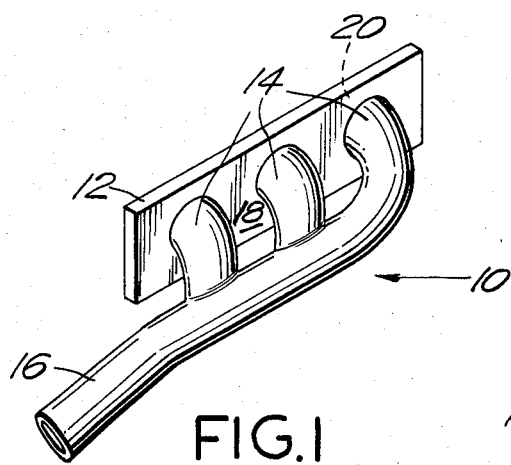
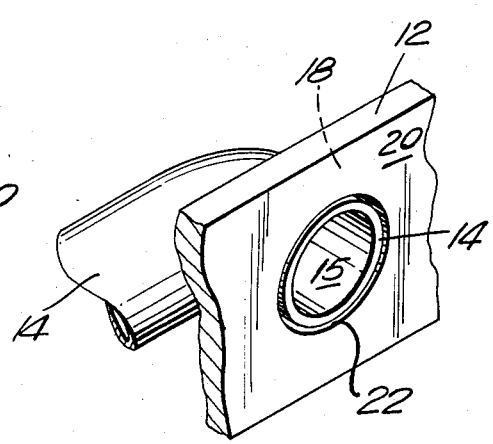
FIG.1
FIG.2 (PRIOR ART)
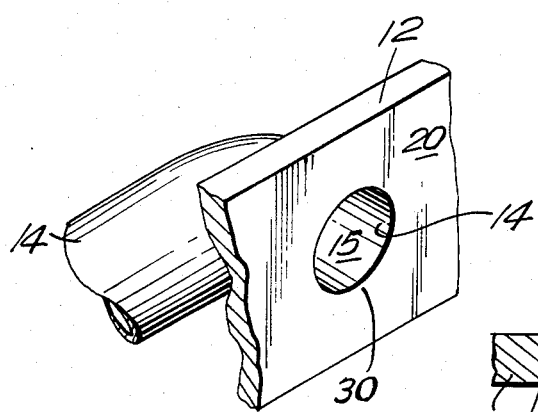
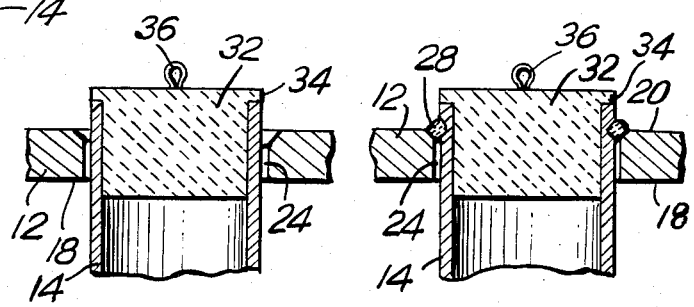
FIG.3
FIG.7
FIG.8
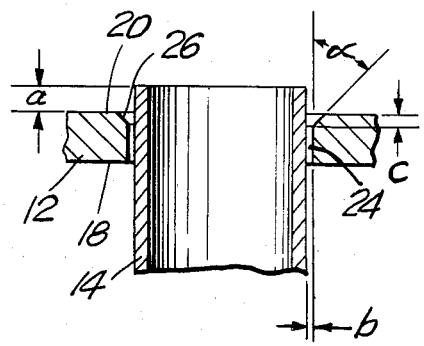
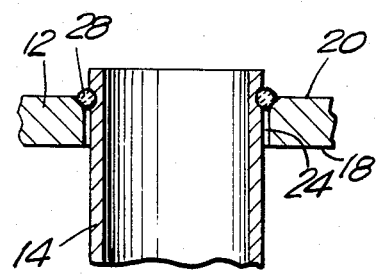
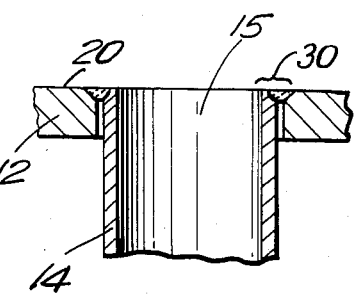
FIG.4
FIG.5
FIG.6

FLANGE WELD TECHNIQUE

BACKGROUND OF THE INVENTION

The present invention is directed to the field of flanges connected to pipes, and more particularly to a technique for welding pipes, especially manifold pipes to a flange.

In preparing exhaust manifolds and other gas carrying pipes in internal combustion engines, it is usually necessary to provide at least one end of such pipes with a flange which is adapted to be connected to a structure such as an engine head.

More specifically, an exhaust manifold, for example, is usually provided with a common flange connected to the ends of the exhaust pipes or tubes to thereby facilitate the connection of the tubes to the engine head. Typically, in preparing an exhaust manifold, it has been the practice to weld the manifold tubes to the flanges on the "tube side" of the flange, as opposed to the "head side" of the flange, since welding at the latter location would produce a rough surface and a significant amount of the weld material would project into the exhaust port, thus restricting the flow passages.

Unfortunately, welding the manifold to the flange from the tube side is made difficult by the arrangement of the tubes in the manifold. Specifically, it is necessary to provide a weld about the entire circumference of each tube. Since there are usually a number of tubes which extend from the engine head to the manifold collector, adjacent tubes interfere with each other during welding. The welding about the entire circumference of each tube from the tube side is thus rendered relatively difficult, expensive and time consuming. Also, an undesireable gap between the tube and the flange, on the head side of the flange, will result when this technique is employed.

OBJECTS AND SUMMARY OF THE INVENTION

It is therefore an object of the invention to overcome the difficulties associated with the prior art welding technique.

It is a further object of the invention to provide a technique for welding a tube to a flange on the side of the flange opposite the tube.

It is a further object to provide a low cost and rapid technique for welding a tube to a flange.

Briefly, a first aspect of the present invention is directed to a method for securing a tube to a flange comprising the steps of inserting the end of the tube into an aperture provided on the flange from a first side of the flange such that the tube extends at least to the surface of the second side of the flange opposite the first side. The tube is then welded to the flange about the circumference of the tube from the second side of the flange. Any weld material which is deposited on the second side of the flange is then removed to produce the final product.

Specifically, the aperture may be provided with a diameter such that a gap, b, exists between the tube and the flange when the tube is inserted into the aperture. A chamfer may also be provided at the intersection of the aperture and the second side of the flange, the chamfer having an angle, $\alpha$ and extending into the flange to a depth, c.

The step of inserting may include the step of inserting the end of the tube into the aperture such that a portion of the tube extends beyond the second side of the flange by distance, a, and the step of removing may include the step of removing the portion of the tube which extends beyond the second side of the flange.

In accordance with the preferred embodiment, the distance, a, is about ¼ inch, the gap, b, is about 0.06 inch, the angle, $\alpha$, is approximately 45° and the depth, c, is approximately 0.09 inch.

The step of welding may be accomplished through the use of a consumable electrode welder and the step of removing the portion of the tube which extends beyond the flange may be achieved through grinding. The method may further include the step of spot welding at least a portion of the tube to the flange from the first side of the flange prior to welding from the second side of the flange in order to hold the tube and the flange in relatively fixed positions.

In accordance with a second aspect of the present invention, a method for securing a tube to a flange includes the steps of inserting the end of a tube into an aperture on a flange from a first side of the flange such that the tube extends at least to the surface of the second side of the flange. A plug is then inserted into the end of the tube and the tube is welded to the flange about the circumference of the tube from the second side of the flange while the plug is in the end of the tube. The plug is then removed from the tube and any weld material deposited on the surface of the second side of the flange is removed.

Specifically, the plug may be made of a refractory material, preferably ceramic. The plug is adapted to fit tightly into the end of the tube and has a cross-section substantially identical to the cross-section of the tube. The plug may be provided with a protruding flange at the top thereof to prevent the plug from being inserted too far into the tube and the plug may be provided with means at top thereof for facilitating the removal of the plug from the tube.

The present invention is also directed to a tube secured to a flange in accordance with the above-described methods.

In accordance with a third aspect of the invention, a plug is adapted to be disposed within the end of a hollow tube during the welding of the tube about its circumference to a flange through which it extends. The plug is made of a refractory material and has a cross-section and dimensions substantially identical to the interior of the tube so as to fit tightly therein. The plug is preferably provided with a protruding flange at the top thereof to prevent it from being disposed too far inside the tube and means on the top of the plug for facilitating the removal of the plug from the tube.

In accordance with the fourth aspect of the invention, a tube and flange combination comprises a flange, a tube and an interface portion connecting the tube to the flange. The flange is provided with substantially planar top surface and an aperture therethrough. The tube extends through the bottom surface of the flange to the top surface of the flange, the end the tube being substantially disposed in the plane of the top surface of the flange. The interface portion connects the tube to the flange at the aperture of the flange. The interface portion comprises (i) a chamfer in the flange at the intersection of the top surface and the aperture, (ii) weld material disposed between the tube and the flange at the chamfer. The weld material functions to fasten the tube to the flange and has a top weld surface substantially disposed in the plane of the top surface of the flange. The above combination may further include a gap between the tube and the flange underneath the weld material.

BRIEF DESCRIPTION OF THE DRAWINGS

These and other objects and aspects of the invention will be described in more detail with reference to the following drawing figures of which:

FIG. 1 is a perspective view of an exhaust manifold having a flange secured thereto as seen from the tube side of the flange;

FIG. 2 is a perspective view of a portion of the flange illustrating the connection between one of the tubes of the exhaust manifold and the flange produced according to the prior art welding technique, as viewed from the head side of the flange;

FIG. 3 is a perspective view of a portion of the flange illustrating the connection between one of the tubes of the manifold and the flange produced according to the present invention, as viewed from the head side of the flange;

FIGS. 4-6 illustrate the process for welding each manifold tube to the flange in accordance with the present invention; and FIGS. 7 and 8 illustrate the optional step of inserting a ceramic plug into the tube prior to welding.

DETAILED DESCRIPTION OF THE INVENTION

With reference to FIG. 1, exhaust manifold 10 is adapted to be secured to the head of an engine (not shown) through the use of flange 12 which is adapted to be placed directly on a complementary surface on the engine head and bolted thereto by conventional means. The exhaust manifold 10 as shown in FIG. 1 is comprised of three exhaust pipes or tubes 14 and a common pipe or tube 16 which is sometimes referred to as a collector. Although an exhaust manifold of the type illustrated in FIG. 1 will be employed in the following discussion, it will be readily apparent to those skilled in the art that other types of structures, such as "header" type exhaust manifolds, thermal reactors, and the like, may readily employ the techniques of the present invention.

Also indicated in FIG. 1 is what will hereinafter be termed the "tube side" 18 of the flange 12, which is opposite the "head side" 20 of the flange. FIG. 2 illustrates one of the tubes 14 and an associated section of the flange 12 from the head side 20 thereof. The prior art technique for securing the tube 14 to flange 12 would be to weld the tube 14 about its circumference to flange 12 from the tube side 18 of the flange since to weld from the head side 20 would produce a rough flange surface and ports 15 could be obstructed by weld material. However, welding from the tube side results in a gap 22 between the tube 14 and flange 12. Thus, the end product produced by the prior art welding technique is not optimum from an aesthetic point of view, and the total sealing surface area provided between the flange and the head is reduced by the area of the gap 22 thus reducing the quality of the seal between the head and the flange. Further, those skilled in the art will appreciate that welding about the entire circumference of tube 14 from the tube side 18 of the flange 12 is cumbersome, especially where multiple tubes are involved, as shown in FIG. 1, for example.

The tube-to-flange connection produced by employing the technique of the present invention is illustrated in FIG. 3. As shown therein, there is no gap between tube 14 and flange 12, the head side 20 of the flange 12 forming a smooth and gap free interface with the tube 14. The total sealing surface area provided between the head and the flange is thus maximized. Additionally, the tube 14 is welded to the flange 12 from the head side 20 of the flange to thereby greatly facilitate the welding operation. The technique for producing such connection will be described with reference to FIGS. 4-6.

With specific reference to FIG. 4, tube 14 and flange 12 are shown in cross-section. The flange 12 is provided with an aperture 24 through which tube 14 may extend by an approximate distance, a. The aperture is provided with a diameter slightly greater than the outer diameter of the tube 14 to produce a gap, b, therebetween, and the head side 20 of the flange is provided with a chamfer 26 about the circumference of the aperture 24. The chamfer 26 is provided at an angle, $\alpha$, relative to tube 14, and extends downwardly to a depth, c.

After positioning the tube 14 relative to the flange 12 as shown in FIG. 4, a few spot welds on the tube side 18 may be optionally employed to relatively fix the positions of the tube and flange if desired. The tube may then be welded to the flange about its entire circumference from the head side 20 of the flange. By extending the tube 14 beyond the head side 20 by the distance, a, the tube acts as a dam for the weld material to thereby eliminate any weld bead from entering the port area 15. However, in applications where weld spatter on the ID of the tube is unimportant, the tube need only extend to the surface of the flange and not beyond (a=o). The use of the chamfer 26 and gap, b, allow the weld material to penetrate well below the surface of the head side 20 of the flange to thereby ensure a solid and secure connection between the tube and flange.

Generally, the distance, a, will usually be up to approximately $\frac{1}{2}$ of an inch, and the gap, b, will usually be between approximately 0.01 inch and 0.1 inch. The angle, $\alpha$, will usually be between approximately 20° and 60°, and the depth of the chamfer, c, will be between approximately 0.01 inch and 0.15 inch.

In accordance with a specific example, the distance, a, that the tube extended beyond the head side 20 of the flange was approximately 0.25 inch, the clearance, b, between the tube 14 and the flange 12 was approximately 0.060 inch, and the chamfer was provided with an angle, $\alpha$, of approximately 45°, to a depth, c, of approximately 0.090 inch.

The specific weld technique employed will be a function of the materials used in the tube 14 and flange 12, as is well known in the art. In accordance with the above example, stainless steel was employed as the tube material, while the flange 12 consisted of carbon steel. A 20.5 volt, 205 amp., 220 inch per minute wire speed was employed in a consumable electrode welder. A slight gun angle (push) of approximately 2° was employed and the wire was concentrated on the heavier flange material. The weld speed was approximately 32 inches per minute, and a shield gas of 98% argon and 2% oxygen was employed at a 35 cubic feet per hour rate. The particular wire employed is designated 0.045 ER 409 $C_b$.

Returning to FIG. 5, after welding, the weld bead 28 extends about the entire circumference of the tube 14 and is disposed between the tube 14 and the flange 12, extending downwardly a sufficient distance into the gap to ensure a solid and secure connection between the tube and the flange. The portions of the tube 14 and weld bead 28 which extend upwardly beyond the head side surface of the flange 12 may be removed by any convenient grinding technique, such as blanchard grinding, surface grinding or milling, to produce the final product illustrated in FIGS. 3 and 6. Of course, if the tube did not originally extend beyond the flange surface, only the weld bead would be ground. As shown in FIG. 6, the interface 30 between the tube 14 and the flange 12 is smooth, free from irregularities and secure. Since the weld bead and tube material are typically stronger and more durable than the flange material, the sealing surface will be especially strong at the interface 30 where it is most needed. Additionally, since the welding is accomplished on the head side 20 of the flange, the welding is less complicated, quicker and less expensive than the prior art since there is no interference between the tubes.

An optional step in accordance with the present invention employs the use of a plug 32 as shown in FIGS. 7 and 8. The plug 32 is inserted into tube 14 prior to welding in order to further prevent welding spatter on the interior portions of the tube and to prevent burn-through of the tube 14 during the welding operation. Specifically, plug 32 is preferably made of a ceramic or other refractory material and has a cross-section substantially identical to the shape of the tube, i.e. round for a round tube and square for a square tube. The dimensions of the plug are such that it fits tightly into the tube and extends downwardly into the tube well beyond the area of welding. The plug 32 may be provided with an outwardly extending flange 34 at the top thereof adapted to prevent the plug from being inserted too far into the tube, and an eyelet 36, or other device at the top of the plug to help facilitate the removal of the plug from the tube. Since there is no possibility of welding spatter ocurring on the inside of tube 14, any ID grinding operations are completely eliminated. Additionaly, the use of the ceramic plug 32 prevents burn-through of the tube 14 at the point of the weld, since the ceramic material will function to dissipate heat from tube 14.

As shown in FIG. 7, the plug 32 is inserted into the tube 14 prior to welding, and is kept there through the welding operation as illustrated in FIG. 8. After welding, the plug may be removed to produce the intermediate product illustrated in FIG. 5. The portion of the tube 14 extending beyond the flange may then be removed as discussed with reference to FIG. 6. However, if desired, the tube need only extend through the aperture to the surface of the flange and not beyond (a=o), in which case only the weld material need be ground off, since the plug will prevent weld splatter from entering the tube.

In fabricating the exhaust manifold illustrated in FIG. 1, or any multi-tube structure, the above-described method may be practiced simultaneously on all such tubes connected to the flange, or individually, as desired. That is, each tube may be positioned, welded and ground substantially at the same time as the other tubes, or each tube may be treated individually.

As will be appreciated by those skilled in the art, the above-described technique may be used in many applications other than the fabrication of an exhaust manifold, the present technique readily lending itself to the fabrication of virtually any flange for a pipe fitting. Although illustrated and described as being round, the tube may have virtually any cross section, such as square, oval, rectangular, etc., as desired. The distances, dimensions and angles discussed with reference to FIG. 4 may readily be modified by those skilled in the art in order to achieve any particular effect as desired. Further, the specific weld technique discussed above is forth merely as an example, many other types of welding also being available as a matter of choice. Such modifications are intended to be fully within the scope and spirit of the present invention.

Although the present invention has been described with reference to the foregoing specification and drawings, the scope of the invention will now be defined with reference to the following claims.

What is claimed is:

1. A method for manufacturing an exhaust manifold for mounting on an engine head, said method comprising:
   providing a flange having opposed first and second sides and at least one aperture therein, said flange being defined by a chamfer at the intersection of said aperature and said second side, said chamfer having an angle of between approximately 20° and approximately 60° and extending into said flange to a depth of between approximately 0.01 inch and approximately 0.15 inch;
   providing at least one tube dimensioned to fit in said aperture such that a gap of between approximately 0.01 inch and approximately 0.1 inch exists between said tube and said flange;
   inserting one end of said tube into said aperature from the first side of said flange such that said tube extends beyond the surface of the second side of the said flange a distance of up to approximately one-half inch;
   welding said tube to said flange about the circumference of said tube from the second side of said flange; and
   removing any weld material from the surface of the second side of said flange and removing the portion of the tube which extends beyond the second side of said flange, whereby the portion of said tube extending beyond said flange substantially prevents weld material from entering said tube during said welding, and whereby the removal of said portion of said tube enables proper mounting of said flange on the engine head.

2. The method of claim 1 wherein said step of welding comprises welding with a consumable electrode welder.

3. The method of claim 1 wherein said step of removing comprises grinding off said portion of said tube.

4. The method of claim 1 further comprising the step of spot welding at least a portion of said tube to said flange from the first side of said flange prior to the step of welding about the circumference of said tube from the second side of said flange.

5. The method of claim 1 further comprising the steps of inserting a plug into the end of the tube after the tube has been inserted into the flange and removing the plug from the end of the tube after the tube has been welded to the flange.

6. The method of claim 3 wherein said step of inserting a plug comprises inserting a plug made of a refractory material.

7. The method of claim 6 wherein said refractory material comprises ceramic.

8. The method of claim 6 wherein said step of inserting a plug comprises inserting a plug which fits tightly into the end of the tube.

9. The method of claim 8 wherein the step of inserting a plug further comprises inserting a plug having a cross-section substantially identical to the cross-section of the tube.

10. The method of claim 9 wherein the step of inserting a plug further comprises inserting a plug having a protruding flange at the top thereof to prevent the plug from being inserted too far into the tube.

11. The method of claim 10 wherein the step of inserting a plug further comprises inserting a plug having means at the top thereof for facilitating the removal of the plug from the tube.

12. An exhaust manifold made in accordance with the method of claim 1.

* * * * *